United States Patent [19]

Canders

[11] Patent Number: 5,457,870
[45] Date of Patent: Oct. 17, 1995

[54] METHOD OF MAKING A ROTOR

[75] Inventor: Wolf-Ruediger Canders, Osterode am Harz, Germany

[73] Assignee: Piller-GmbH, Osterode am Harz, Germany

[21] Appl. No.: 263,658

[22] Filed: Jun. 21, 1994

[30] Foreign Application Priority Data

Jun. 24, 1993 [DE] Germany .................. 43 20 894.0

[51] Int. Cl.⁶ .................................. H02K 15/02
[52] U.S. Cl. .................. 29/598; 156/294; 310/156; 310/262
[58] Field of Search ................ 29/598, 596; 156/294, 156/303.1; 310/42, 43, 156, 262

[56] References Cited

U.S. PATENT DOCUMENTS 5,237,737  8/1993  Zigler et al. .................. 29/598

FOREIGN PATENT DOCUMENTS 3224904  4/1984  Germany .

*Primary Examiner*—Carl E. Hall
*Attorney, Agent, or Firm*—Barry R. Lipsitz

[57] ABSTRACT

In order to improve a rotor for electric machines, in particular for machines of high rotational speed, having a rotor core and a rotor shell comprising a binding made of fiber-reinforced plastics radially supporting the rotor core such that the rotor shell is supported on the rotor core essentially over the entire surface and with an essentially uniform surface load, it is suggested that the rotor core has an outer shell surface with a small cone angle on which the rotor shell is supported with an inner shell surface having the same cone angle, and that the rotor shell has a protective layer between the inner shell surface and the binding.

13 Claims, 5 Drawing Sheets

METHOD OF MAKING A ROTOR

The invention relates to a rotor for electric machines, in particular for machines of high rotational speed having a rotor core and a rotor shell or casing which comprises a binding made of fiber-reinforced plastics radially supporting the rotor core.

Moreover, the invention concerns a method for manufacturing a rotor for electric machines, particularly for machines of high rotational speed, having a rotor core and a rotor shell which comprises a binding made of fiber-reinforced plastics radially supporting the rotor core.

Revolutions of more than 18,000 r.p.m. are understood under high rotational speed, in particular rotations between approximately 18,000 and approximately 120,000 r.p.m.

Rotors of this type are, in particular, rotors for permanently excited electric machines wherein highly residual permanent magnets, in particular, are used which are very brittle and very susceptible with respect to stress loads and tractive forces due to their internal structure and thus cannot be used as supporting material since they are not in a position to absorb tractive forces.

Such permanent magnets are arranged in the rotor core and tractive forces in these permanent magnets are compensated by the rotor shell.

Rotors of this type are, for example, disclosed in DE-OS 32 24 904.

This publication describes the use of a metallic rotor shell on the one hand, which is pushed onto a rotor core having a conical outer shell surface as so-called "armour".

However, a metallic shell or casing of this type has numerous disadvantages, in particular when using the rotor for high rotational speeds.

For this reason, a rotor shell made of fiber-reinforced plastics is also described in DE-OS 32 24 904, whereby the rotor shell is formed with a cylindrical inner surface by a cylindrically wound fiber binding.

In order to achieve a biasing potential in this rotor shell with a binding made of fiber-reinforced plastics, wedges displaceable in opposite directions are provided at numerous positions at the periphery of the rotor core, these wedges effecting a radial force on the rotor shell in the region of the wedges.

However, this wedging of the rotor shell leads to the fact that great radial forces act on the rotor shell in the area of the wedges, on the one hand, and on the other hand, the biasing potential with which the rotor shell acts on the rotor core between the wedges, is far smaller and, in particular, the rotor shell does not rest with its entire surface on the rotor core.

Thus, the object underlying the invention is to improve a rotor of the generic type such that the rotor shell rests on the rotor core essentially over its entire surface and with an essentially uniform surface load.

This object is accomplished in accordance with the invention in a rotor of the type described at the outset, in that the rotor core has an axially symmetrical outer shell surface with a small cone angle, the rotor shell being supported on this outer shell surface with an axially symmetrical inner shell surface having the same cone angle and that the rotor shell has a protective layer between the inner shell surface and the binding.

The advantage of the solution according to the invention is to be seen in the fact that the use of a conical outer shell surface and a corresponding inner shell surface is possible without damaging the binding due to the protective layer provided, that in addition, the protective layer prevents damage to the fibers of the binding caused by friction on the rotor core, for example during the change of rotational speed, and that besides this, the protective layer also prevents corrosion between the binding and the material of the rotor core, which is preferably steel.

The protective layer can principally be of any design. In order to produce a particularly stable protective layer, it is preferable that the protective layer comprises a carrier layer.

The most varied types of layer materials are conceivable as carrier layer whereby these materials, however, should be in a position to withstand the occurring pressure forces. A particularly advantageous embodiment provides for the carrier layer to be penetrated by a bonding agent and both together forming the protective layer, so that the bonding agent can contribute to stabilizing and securing the carrier layer in order to achieve the required strength values.

The protective layer can principally be connected with the binding in the most varied of ways. For example, it is conceivable to connect the protective layer with a separately manufactured binding.

However, it is of even greater advantage when the bonding agent is identical with a matrix material of a plastics matrix embedding or integrating the fibers of the binding. In this case, an optimal compatibility is achieved between the bonding agent of the protective layer and the binding due to the identity of the matrix material.

In a particularly expedient solution, the plastics matrix penetrates the binding and the carrier layer as continuous plastics matrix and in particular, an integral component results thereby which comprises the protective layer as well as the binding, whereby the integral character of this component is dependent on the continuous plastics matrix.

In view of the carrier layer, the most varied of materials are conceivable. Thus, one embodiment provides for the carrier layer to be made of a fleece, preferably a polyester fleece. As an alternative, it is likewise conceivable to manufacture the carrier layer from a fiber fabric, for example a glass fiber fabric.

Synthetic resin is preferably used as matrix material.

With respect to the connection between the rotor shell and the rotor core, no further details were specified in connection with the previous explanations of the individual embodiments. Thus, for example, it is advantageous to fix the rotor shell on the rotor core such that the cone angle lies in the range of a self-locking cone, so that no separate measures are necessary for connecting rotor shell and rotor core.

Especially due to the high rotational speeds and the alternating loads and continuous loads it has, however, proven to be advantageous, particularly supplementary to a self-locking cone angle, when the rotor shell is held on the rotor core by means of an adhesion promoting layer between the inner shell surface of this rotor shell and the outer shell surface of the rotor core. In this respect, the adhesion promoting layer can also be designed in the most varied of ways.

It is particularly advantageous when the adhesion promoting layer is formed by a hardened flowable mass, since an adhesion promoting layer of this type can be easily introduced in its flowable state between the inner shell surface of the rotor shell and the outer shell surface of the rotor core.

It is even more advantageous when the flowable mass forming the adhesion promoting layer forms in the non-hardened state a gliding layer between the outer shell surface of the rotor core and the inner shell surface of the rotor shell, since such a gliding layer facilitates the action of pushing the rotor shell onto the rotor core.

In a particularly expedient embodiment, the mass forming the adhesion promoting layer is an adhesive mass connecting the rotor core and the rotor shell, so that the connection between rotor core and rotor shell is not only maintained by the self-locking cone angle selected, but is also additionally secured by the adhesive action of the mass.

In one advantageous embodiment, the mass is a synthetic resin.

With respect to the type of design of the binding, no further details were given in connection with the embodiments described previously. Thus, an advantageous embodiment provides for the binding to bias the rotor core in radial direction in order to compensate the centrifugal forces active in the rotor core during high rotational speeds.

In a particularly expedient embodiment of the solution according to the invention, the binding acts on the rotor core with a radial biasing potential essentially constant in peripheral direction or azimuthal direction, i.e. that the binding acts on the rotor core at every point of the periphery with the same force in radial direction and visa versa, so that no local peak loads occur in individual regions of the binding which is advantageous when the binding is to be dimensioned as thin as possible and on the other hand, however, is to be sufficiently stable and also ought to have a high durability at high rotational speeds.

It has proven to be particularly advantageous when the binding comprises a fiber spirally wound essentially coaxially to the rotor core.

In this respect, the binding is preferably manufactured such that it comprises spirally wound fiber layers.

In order to manufacture a rotor shell with a conical or tapered inner shell surface as simply as possible and with as great a stability of the binding as possible, it is advantageously provided for an interior fiber layer of the binding facing the inner shell surface to form a conical layer surface, whereby this conical layer surface, in particular, has the same cone angle as the inner shell surface.

It is even more advantageous when the binding comprises a plurality of fiber layers forming conical layer surfaces.

In a particularly expedient embodiment, the binding has a cylindrical outer shell surface; this has the great advantage that the binding has the greatest thickness at the end where the cone of the outer shell surface of the rotor core has the smallest diameter and thus has a greater stability at this point which has a favourable effect when the binding is to be acted upon at this end in order to be pushed onto the rotor core.

Further, the object underlying the invention is to improve a method of the generic type such that a rotor can be manufactured, the rotor shell of which rests essentially over its entire surface and essentially uniformly on the rotor core.

In addition to this, the inventive object is accomplished in accordance with the invention in a method of the type described at the outset such that the rotor core is manufactured with an axially symmetrical outer shell surface having a small cone angle, that the rotor shell is manufactured with an inner shell surface having the same cone angle and undersized with respect to the outer shell surface, that the rotor shell with its inner shell surface is pushed onto the outer shell surface of the rotor core in axial direction to form a uniform contact over the entire surface and for pushing the rotor shell onto the rotor core a hardenable flowable mass is inserted between the inner shell surface and the outer shell surface as a gliding aid.

With the solution according to the invention, a particularly simple possibility is created to put a rotor shell with its conical inner shell surface on the outer shell surface of the rotor core, namely such that when pushing the rotor shell onto the rotor core, the desired and defined biasing potential is attained in the rotor shell without damaging the rotor shell, in particular, the binding of the same. In this respect, the flowable mass serves as gliding aid when pushing on the rotor shell and hardens afterwards, so that particularly in the case of a self-locking cone angle, the rotor shell is prevented from sliding off the rotor core already due to the friction between the hardened flowable mass and the outer shell surface as well as the inner shell surface.

In this respect, the hardenable mass is preferably hardened after the rotor shell is pushed onto the rotor core, namely, in particular when the rotor shell is fixed externally relative to the rotor core.

The solution according to the invention is even more advantageous when a mass acting in the hardened state as adhesive mass between rotor shell and rotor core is used as flowable mass so that the rotor shell is secured with respect to the rotor core not only due to the self-locking cone angle but additionally due to the adhesive action of the flowable mass on the outer shell and inner shell surfaces.

The rotor core normally has an extension in axial direction which should be completely covered by the rotor shell in the complete assembled state. This inevitably results in the fact that when manufacturing a rotor shell with an inner shell surface which is undersized with respect to the outer shell surface of the rotor core, the rotor shell can only be pushed onto the rotor core over a small distance.

In order to facilitate the pushing-on of the rotor shell, it is preferable that the rotor core is provided at its end having the smaller diameter with an auxiliary cone forming a continuation of the outer shell surface for pushing on the rotor shell. This auxiliary cone has the great advantage that it creates the possibility to place the rotor shell with its inner shell surface onto a continuous tapered surface formed by the rotor core and the auxiliary cone, over the entire surface, and to thereby obtain a constant, expanding force acting on the entire surface of the rotor shell during the pushing-on, this force finally leading to the biasing of the rotor shell on the rotor core.

Preferably, the auxiliary cone is removed after the rotor shell has been pushed onto the rotor core. For example, the auxiliary cone is part of an unmachined part later forming the rotor shaft and is machined after the rotor shell is pushed on, for example, by a cutting-machining process.

With respect to the construction of the rotor shell, no further details were specified in connection with the previous explanations of preferred embodiments. Thus, in a favourable embodiment, the rotor shell is manufactured by spirally winding fibers onto a winding mandrel and embedding the same in a plastics matrix.

It is particularly expedient when the rotor shell is manufactured by winding fiber layers extending in axial direction.

For example, the fiber layers could lie in cylinder surfaces. In order to achieve a particularly homogeneous biasing potential later in the rotor shell and, in particular, in the binding, it is however advantageous when an inner fiber layer of the rotor core is wound with a conical layer surface.

This conical layer surface is suitably designed such that it has a cone angle corresponding with the outer shell surface of the rotor core.

The binding is preferably wound from a plurality of fiber layers. For this reason, it is also advantageous for the binding to be manufactured from a plurality of fiber layers lying in conical layer surfaces.

Since the binding used according to the invention and made of fiber-reinforced plastics is always very sensitive, a particularly advantageous embodiment provides for the binding to be wound onto a protective layer.

In this respect, the protective layer is preferably formed by a carrier layer which, for its part, is expediently strengthened further by a bonding agent and is thereby also connected with the binding.

In the simplest case, the binding is wound onto the protective layer.

A particularly favourable embodiment provides for the rotor shell to be manufactured as integral unit consisting of protective layer and binding, by winding the carrier layer with fibers and impregnating the carrier layer with the matrix plastics embedding the fibers of the binding. This means that first of all, the carrier layer is impregnated with the matrix plastics of the binding and after that, the fibers, also wetted with the matrix plastics, are wound so that afterwards, a uniform plastics matrix made of a uniform material penetrates the carrier layer and also embeds the fibers.

This unit subsequently becomes a stable, solid member by hardening the matrix plastics.

In order to protect the rotor, it is advantageous for this rotor to be provided additionally with a cover layer.

Carbon fibers are used as preferred fiber material in the pending invention, so that the binding represents a so-called "CFK" material (carbon-fiber reinforced plastics material).

Since the modulus of elasticity of the binding is clearly lower than the modulus of elasticity of the materials of the rotor core when using fiber-reinforced plastics, it cannot be ruled out that the biasing force acting on the rotor core is partially counteracted at high centrifugal load. To prevent this, the invention further provides for connection regions to be formed between the rotor shaft, in particular a rotor shaft section carrying the layer of permanent magnets, if necessary, filler pieces, and the layer with an elastic adhesion, whereby elastic filler elements can be inserted additionally in the corresponding adhesion grooves. The elastic adhesion can, for example, be made of silicone. The filler elements can, for example, be designed as strips and consist of plastics, for example, aramide. The thickness of the groove should amount to at least 0.2 mm.

An alternate possibility to remedy the mentioned problems is to design the surface of the rotor shaft section with a certain roughness. The elasticity of the rotor core is also increased hereby as a whole. A roughness value Ra of over 12.5 μm (preferably 12.5 to 25 μm) has proven to be particularly advantageous.

Additional features and advantages of the solution according to the invention are the subject matter of the following description as well as the drawings of two embodiments. In the drawings.

Figure 1:
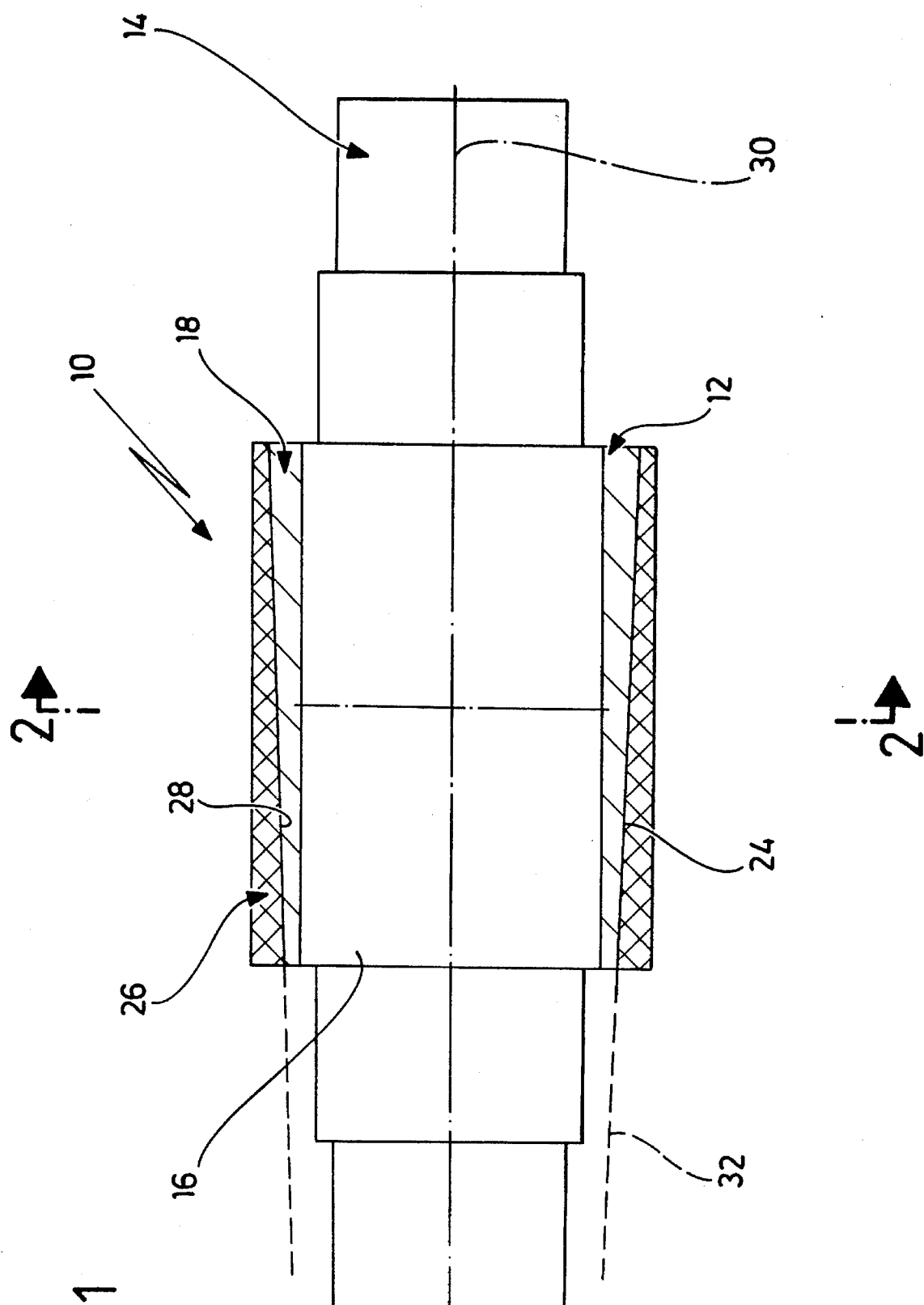
FIG. 1 is a longitudinal section through a first embodiment.
Figure 2:
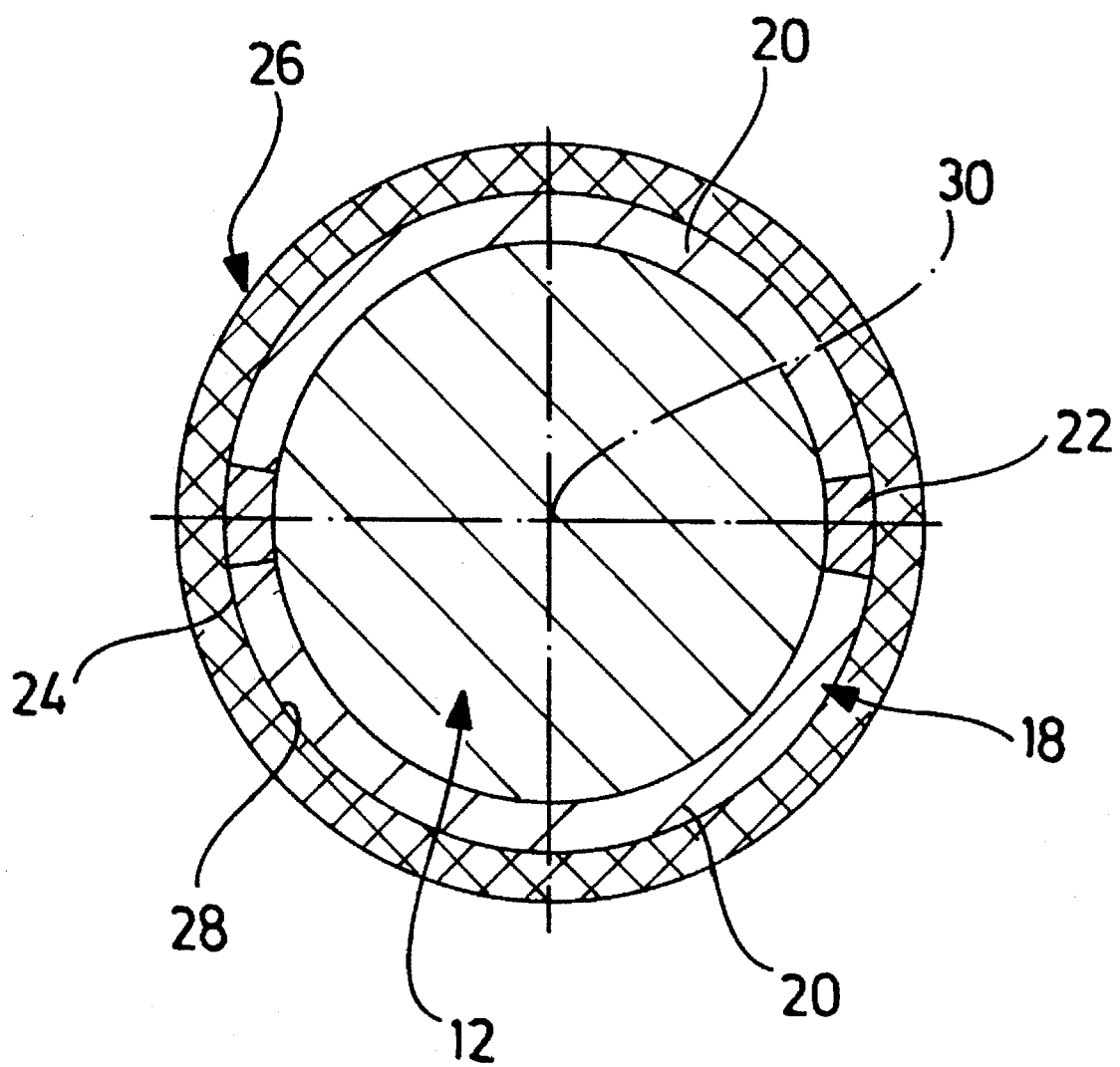
FIG. 2 is a cross section along line 2—2 in FIG. 1.

A first embodiment of an inventive rotor for an electric synchronous machine represented in FIG. 1 and designated as a whole with 10, comprises a rotor core 12 formed by a rotor shaft 14 which carries on a rotor shaft section 16 a magnet layer 18 formed by permanent magnets 20 and filler pieces 22 (FIG. 2) arranged between these magnets if necessary.

The rotor core 12 has, for its part, an outer shell surface 24, on which a rotor shell designated as a whole with 26 rests with its inner shell surface 28.

In this respect, the outer shell surface 28 is designed such that it lies in a conical shell surface 32 coaxial to an axis of rotation 30 of the rotor shaft 14, whereby the conical shell surface has a cone angle of less than 5°.

The rotor core 12 is preferably manufactured in that the magnet layer 18 consisting of permanent magnets 20 and filler pieces 22, is adhered to the rotor shaft section 16 of the rotor shaft 14 and subsequently, the outer shell surface 24 is machined and if necessary, ground in correspondence with the conical shell surface 32.

Figure 3:
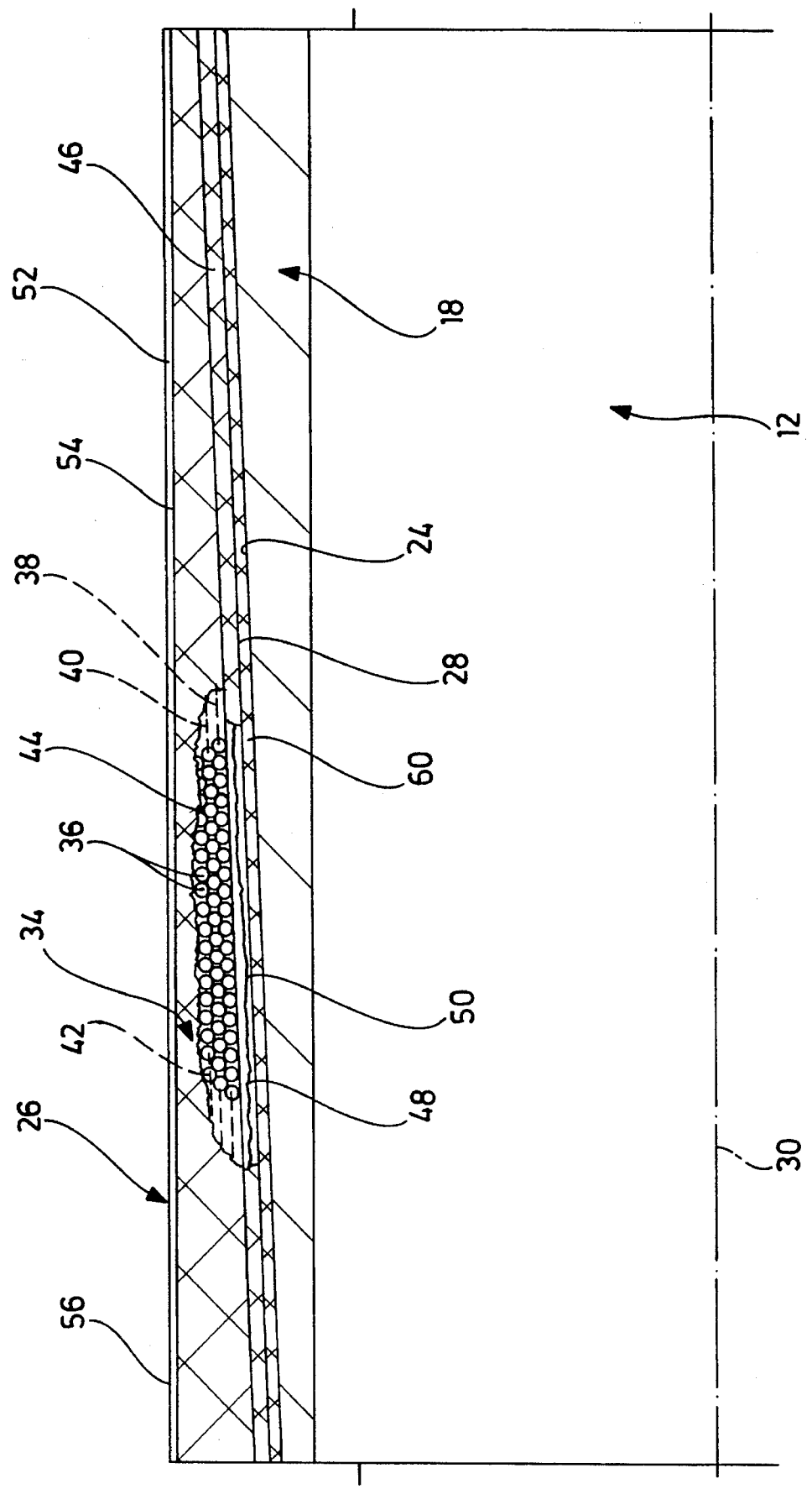
FIG. 3 is an enlarged, semilateral illustration of the longitudinal section in FIG. 1 in detail.

As represented in FIG. 3, the rotor shell 26 comprises a binding 34 which is built up of spirally wound fibers 36 which, on their part, are spirally wound in a plurality of fiber layers 38, 40 and 42, whereby the fiber layers also lie in conical shell surfaces which have the same cone angle as the conical shell surface 32. Furthermore, the fibers 36 are also embedded in a plastics matrix 44, preferably made of epoxy resin, so that as a whole, the binding 34 represents a fiber-reinforced plastics binding, whereby carbon fibers are preferably used as fibers 36.

In addition, the rotor shell 26 comprises a protective layer 46 which is surrounded by the binding 34. The protective layer 46 is constructed of a carrier layer 48 which is impregnated with a bonding agent 50, whereby the bonding agent 50 is formed by the plastics matrix 44 which, on the one hand, strengthens the carrier layer 48, for example in the form of a polyester fleece or a glass fiber weave, and simultaneously combines the carrier layer 48 with the binding 34 to form an integrally constructed part.

Furthermore, the rotor shell 26 bears a cover layer 52 surrounding the binding 34, this cover encloses the binding on its outer side 54 and forms a protective film which, for its part, seals the binding 34 against climatic stresses. Simultaneously, the cover layer 52 forms as smooth a cylindrical outer shell surface 56 of the rotor shell 26, this shell surface being as smooth as possible and coaxial to the axis of rotation 30.

The inner shell surface 28 of the rotor shell 26 is formed by an inner surface of the protective layer 46. In addition, between the inner shell surface 28 of the rotor shell 26 and the outer shell surface 24 of the rotor core 12, there is an adhesion promoting layer 60 which connects the rotor shell 26 with the rotor core 12 and prevents the rotor shell 26 from sliding off with its inner shell surface 28 on the outer shell surface 24. The adhesion promoting layer 60 is suitably made of a hardened flowable mass which forms an adhesive connection with the material of the rotor core 12 as well as with the material of the rotor shell 26, i.e. the protective layer 46, and thereby secures the rotor shell 26 on the rotor core 12.

The manufacturing of the rotor shell 46 preferably takes place separately on a mandrel provided for this, which has a mandrel casing surface having the same cone angle as the conical shell surface 32, however, is undersized in relation to the diameter of the conical shell surface 32.

First of all, the carrier layer 48 is placed on the mandrel casing surface and is impregnated with bonding agent 50, i.e. the plastics also forming the plastics matrix 44 later on. After that, the fibers 36 are wound on in the from of several fiber layers, for example, the fiber layers 38, 40, 42 and others, whereby the carbon fibers 36 are wetted with the plastics forming the plastics matrix 44 during the winding of the fiber layers 38, 40, 42. The protective layer 46 with the binding 34 formed in this manner, is hardened by hardening the plastics matrix 44, in particular in an autoclave process, whereby a diameter in a heated state of the wound core preferably has a defined undersize at hardening temperature with respect to the conical shell surface 32.

After hardening the binding 34 with the protective layer 46, a further machining of the outer surface 54 of the binding 34 takes place in order to obtain as smooth a surface as possible, for example by finish-machining or turning, and the application of the final cover layer 52.

Figure 4:
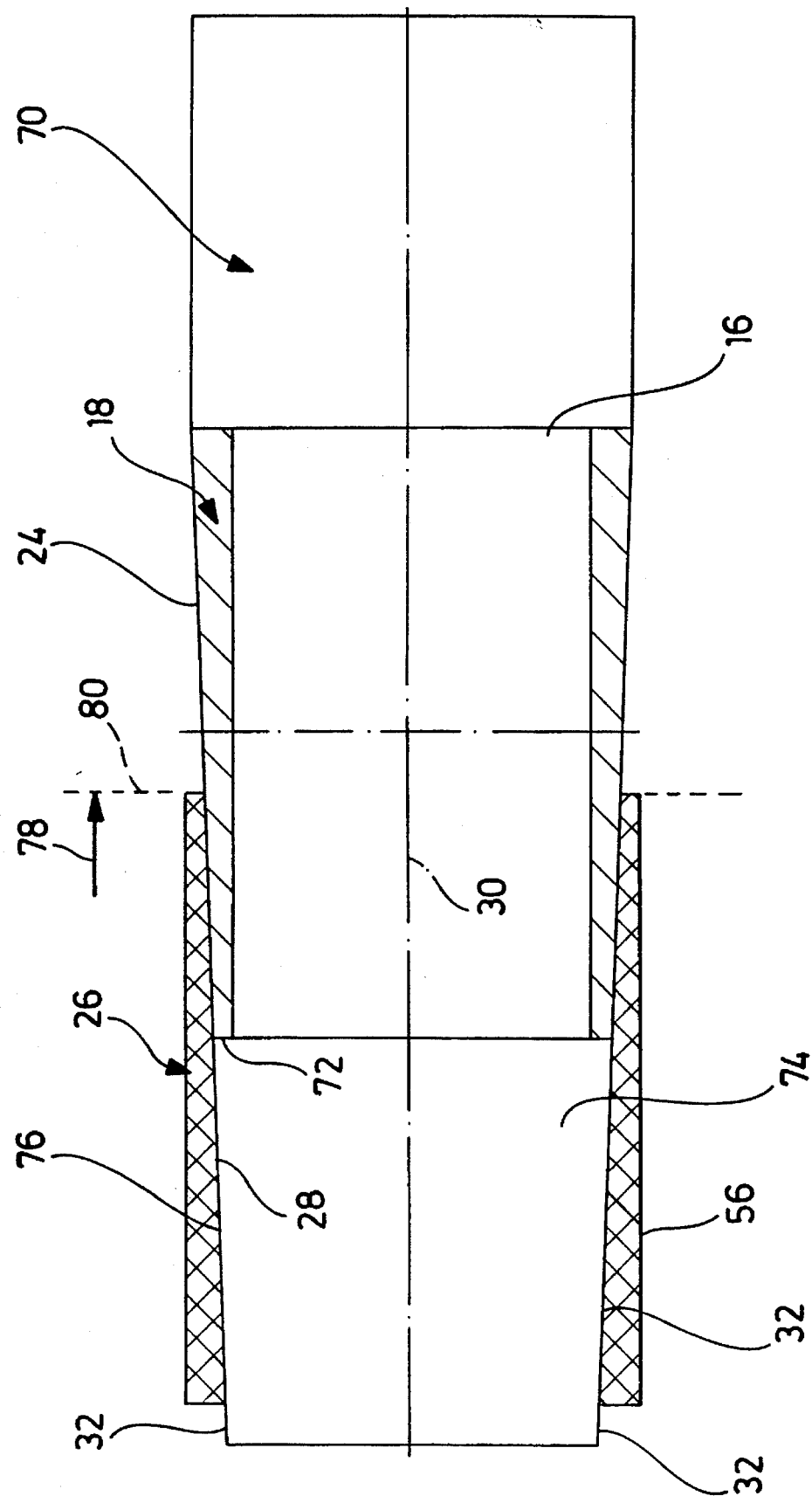
FIG. 4 is an illustration of a rotor shell being pushed on for producing the first embodiment in a longitudinal section similar to FIG. 1

The rotor shell 26 produced with the undersized inner shell surface 28, as illustrated in FIG. 4, is pushed onto the outer shell surface 24 of the magnet layer 18 formed by the permanent magnets 20 and, if necessary, filler pieces 22 located between these magnets.

For this, an unmachined part 70 for the later rotor shaft 14 is prefabricated in the rotor shaft section 16 for receiving the magnet layer 18. Subsequently, after applying the magnet layer 18, the outer shell surface 24 is machined for producing the conical shell surface 32, whereby the unmachined part 70 adjoining one end 72 of the magnet layer 18, which has the smaller radius with reference to the axis of rotation 30 when manufacturing the conical shell surface, extends with the conical shell surface 32 after machining the unmachined part 70 with the magnet layer 18, so that adjoining the end 72, an auxiliary cone 74 is formed on which the conical shell surface 32 is continued in direct connection with the outer shell surface 24.

This auxiliary cone 74 has smaller diameters than the outer shell surface 24 and thus facilitates pushing the rotor shell 26 onto the outer shell surface 24.

In order to facilitate the pushing of the rotor shell 26 onto the auxiliary cone 74 and the outer shell surface 24, the flowable mass later forming the adhesion promoting layer 60 is applied in the flowable state as gliding film 76 to the inner shell surface 28 of the rotor shell 26.

Subsequently, the rotor shell 26 is pushed onto the auxiliary cone 74 and the outer shell surface 24 to the extent that a force to be defined results which counteracts a pushing direction 78. This pushed-on position of the rotor shell 26 defines a zero position 80 from which the rotor shell 26 is then pushed onto the outer shell surface 24 over a distance likewise to be defined. By means of this distance to be defined, a defined biasing of the rotor shell, in particular the binding 34 of the same, is attainable which acts in radial direction on the rotor core 12 and preferably generates a force which is constant in peripheral direction of the rotor core 12 and acts in radial direction on this core.

In order to ensure that the rotor shell 26 in the pushed-on state completely covers the layer 18, the rotor shell 26 is prefabricated so as to be oversized in axial direction of the axis of rotation 30.

The pushed-on rotor shell 26 is secured externally relative to the unmachined part 70 and to the magnet layer 18 and the flowable mass forming the adhesion promoting layer 60 is hardened. After that, the rotor shell 26 is turned or machined to the desired length and subsequently, the unmachined part is finish-turned to the shape desired for the rotor shaft 14 and with that, the auxiliary cone 74 is machined off.

Figure 5:
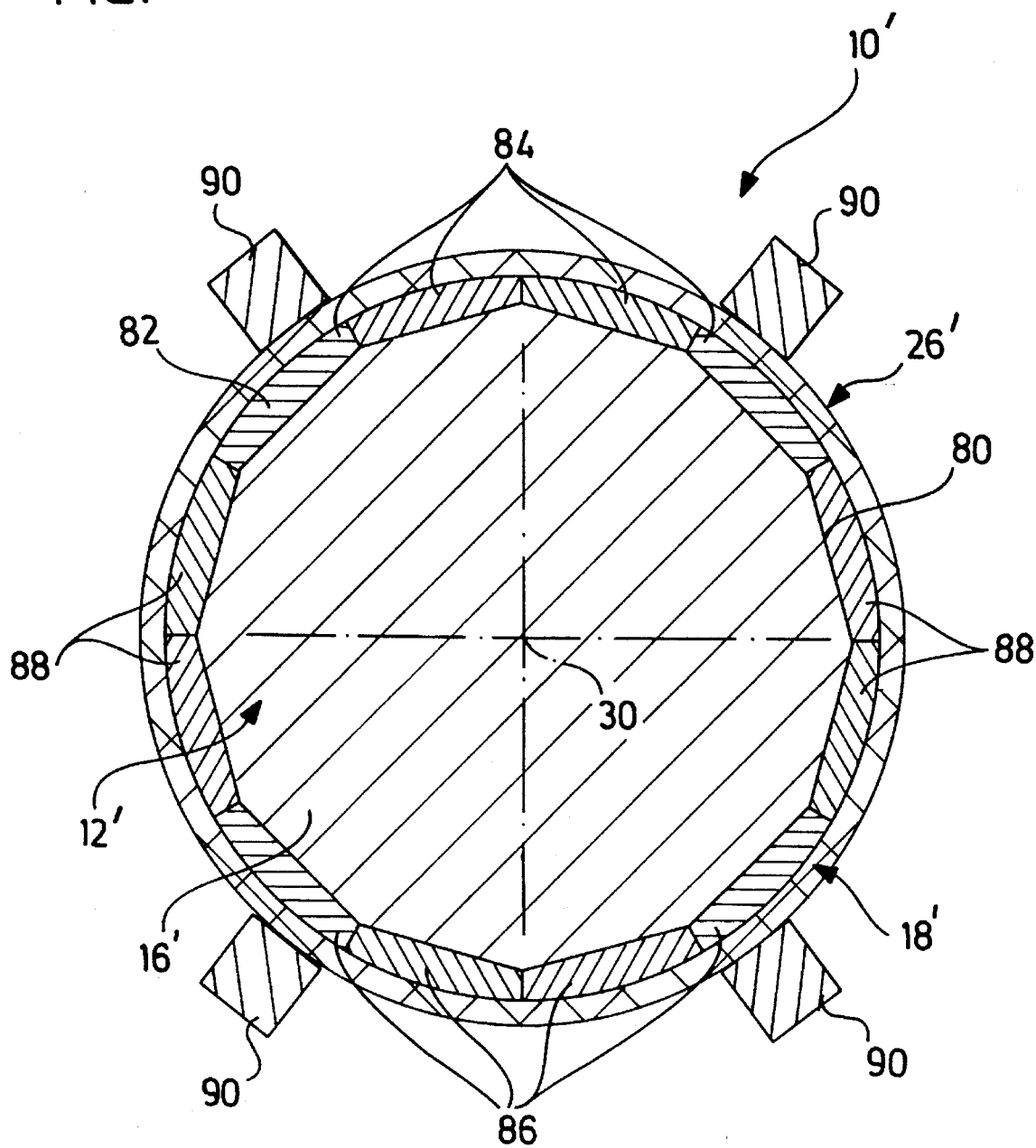
FIG. 5 is a cross section similar to FIG. 2 through a second embodiment.

In a variation of the inventive rotor represented in FIG. 5, the rotor shaft section 16' is designed polygonally, for example, in the form of a dodecagon with a total of 12 surfaces 80 at which permanent magnets 82 are arranged in respective groups of four opposite each other, namely in permanent magnet groups 84, 86 which form the two different magnet poles (North/South). Two soft iron elements 88 are arranged each time between the permanent magnet groups 84, 86 of opposite polarity and separate the permanent magnet groups 84, 86 from each other.

The permanent magnet elements 82 as well as the soft iron elements 88 extend in axial direction to the rotor shaft 14, i.e. parallel to its axis of rotation 30, and are adhered to the corresponding surfaces 80. When manufacturing and assembling the rotor core 12', the permanent magnets 82 and the soft iron elements 88 forming the filler pieces are jointly machined or turned and ground after adhesion, namely such that the conical shell surface 32 results. The rotor shell 26' is then pushed onto this surface, the rotor shell being manufactured as described previously.

In contrast to the first embodiment, however, reinforcement strips 90 are adhered to the outer shell surface 56 of the rotor shell 26', preferably 4 pieces in total uniformly distributed in peripheral direction on the rotor shell 26'. These reinforcement strips 90 can be made of plastics, but likewise be made of metal. With the aid of these reinforcement strips 90 and after the rotor shell 26 has been hardened, this rotor shell is removed from the mandrel without stressing the binding 34. With this, it is possible to dimension the binding 34 merely in correspondence with the radial tractive forces to be absorbed and thus, to manufacture the binding thinner than in the case where a direct impingement of the binding 34 is necessary.

In addition to this, it is possible to push the rotor shell 26—as already described in connection with FIG. 4—onto the conical shell surface 32 with the reinforcement strips 90, and to thereby achieve the corresponding biasing in the rotor shell 26.

The reinforcement strips 90 are removed after the rotor shell 26 has been pushed onto the outer shell surface 24 whereby a heating of the reinforcement strips 90 is sufficient for this when using a thermoplastic adhesive for adhering the reinforcement strips 90 so that subsequently, due to the occurring plasticity of the adhesive, they are removable. There is also the possibility of removing the reinforcement strips 90 by machining or turning.

The present disclosure relates to the subject matter disclosed in German application No. P 4 320 894.0-32 of Jun. 24, 1993, the entire specification of which is incorporated herein by reference.

I claim:

1. A method for manufacturing a rotor for electric machines of high rotational speed, said rotor including a rotor shell having a binding made of fiber-reinforced plastics radially supporting a rotor core, comprising the steps of:

providing said rotor core with an outer shell surface having a small cone angle;

providing said rotor shell with an inner shell surface having the same cone angle and undersized with respect to said outer shell surface;

pushing the inner shell surface of the rotor shell onto the outer shell surface of the rotor core in an axial direction so as to form a uniform contact over the engaging surfaces; and inserting a hardenable flowable mass between the inner shell surface and the outer shell surface as a gliding aid.

2. A method according to claim 1, wherein a mass acting in the hardened state as an adhesive mass is used as said flowable mass between the rotor shell and the rotor core.

3. A method according to claim 1, wherein the rotor core is provided with an auxiliary cone at its end having the smaller diameter, said auxiliary core forming an extension of the outer shell surface for pushing on the rotor shell.

4. A method according to claim 3, wherein the auxiliary cone is removed after the rotor shell has been pushed onto the rotor core.

5. A method according to claim 1, wherein the rotor shell is manufactured by spirally winding fibers onto a winding mandrel and embedding the same in a plastics matrix.

6. A method according to claim 5, wherein the rotor shell is manufactured by winding fiber layers extending in an axial direction.

7. A method according to claim 6, wherein an internal fiber layer of the rotor core is wound with a conical layer surface.

8. A method according to claim 7, wherein the conical layer surface has a cone angle corresponding with the outer shell surface of the rotor core.

9. A method according to claim 1, wherein the binding is wound onto a protective layer.

10. A method according to claim 9, wherein the protective layer is formed by a carrier layer.

11. A method according to claim 10, wherein the protective layer is formed by a carrier layer penetrated by a bonding agent.

12. A method according to claim 10, wherein the rotor shell is manufactured as an integral unit consisting of said protective layer and said binding, by winding the carrier layer with fibers and impregnating the carrier layer with a plastics matrix embedding the fibers of the binding.

13. A method according to claim 1, wherein the rotor shell is provided with a cover layer.

* * * * *